No. 861,830. PATENTED JULY 30, 1907.
L. S. HACKNEY.
AUTOMOBILE TRACK AND MEANS FOR HOLDING AN AUTOMOBILE THEREON.
APPLICATION FILED JUNE 4, 1906.
4 SHEETS—SHEET 1.
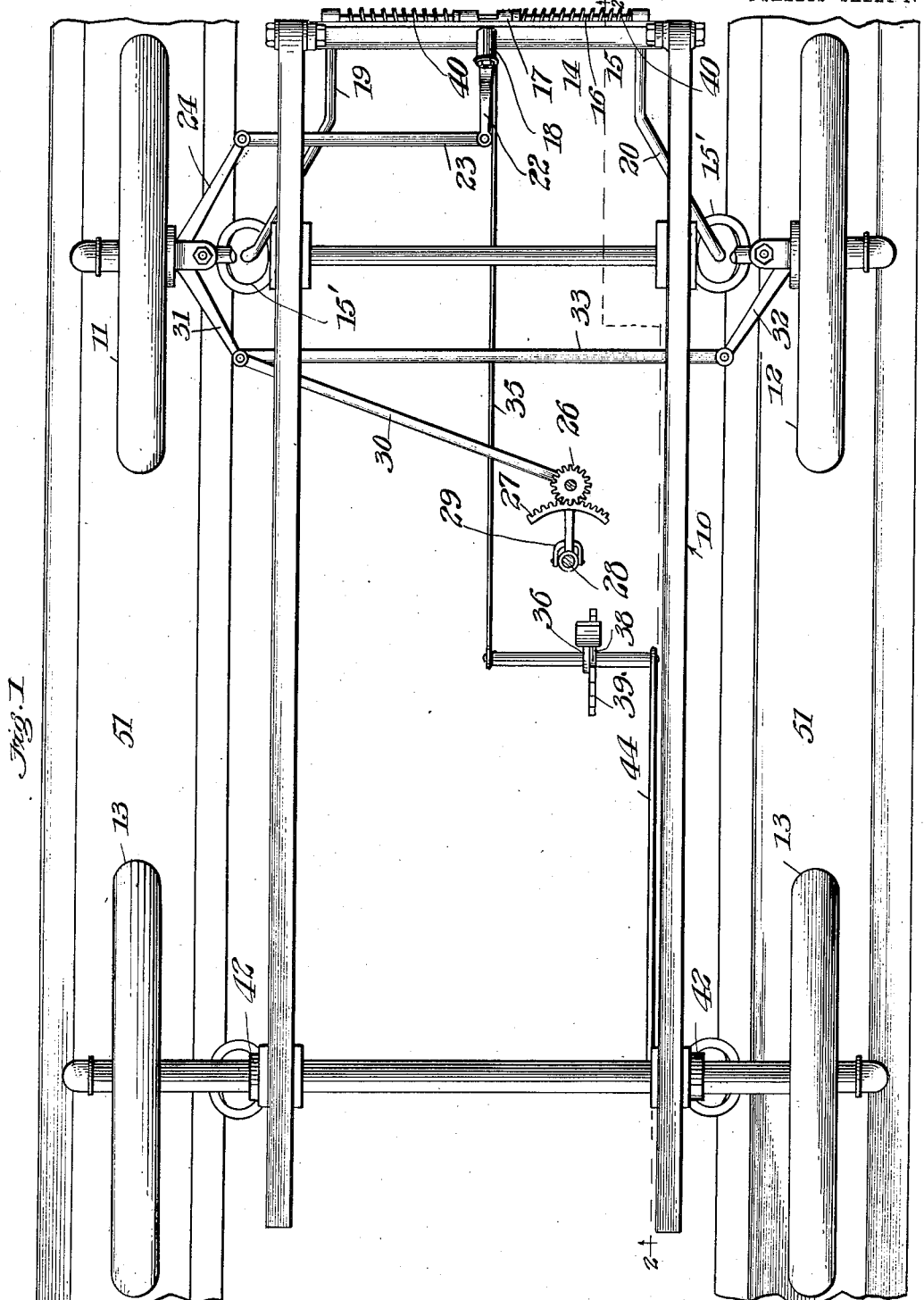

No. 861,830. PATENTED JULY 30, 1907.
L. S. HACKNEY.
AUTOMOBILE TRACK AND MEANS FOR HOLDING AN AUTOMOBILE THEREON.
APPLICATION FILED JUNE 4, 1906.
4 SHEETS—SHEET 2.
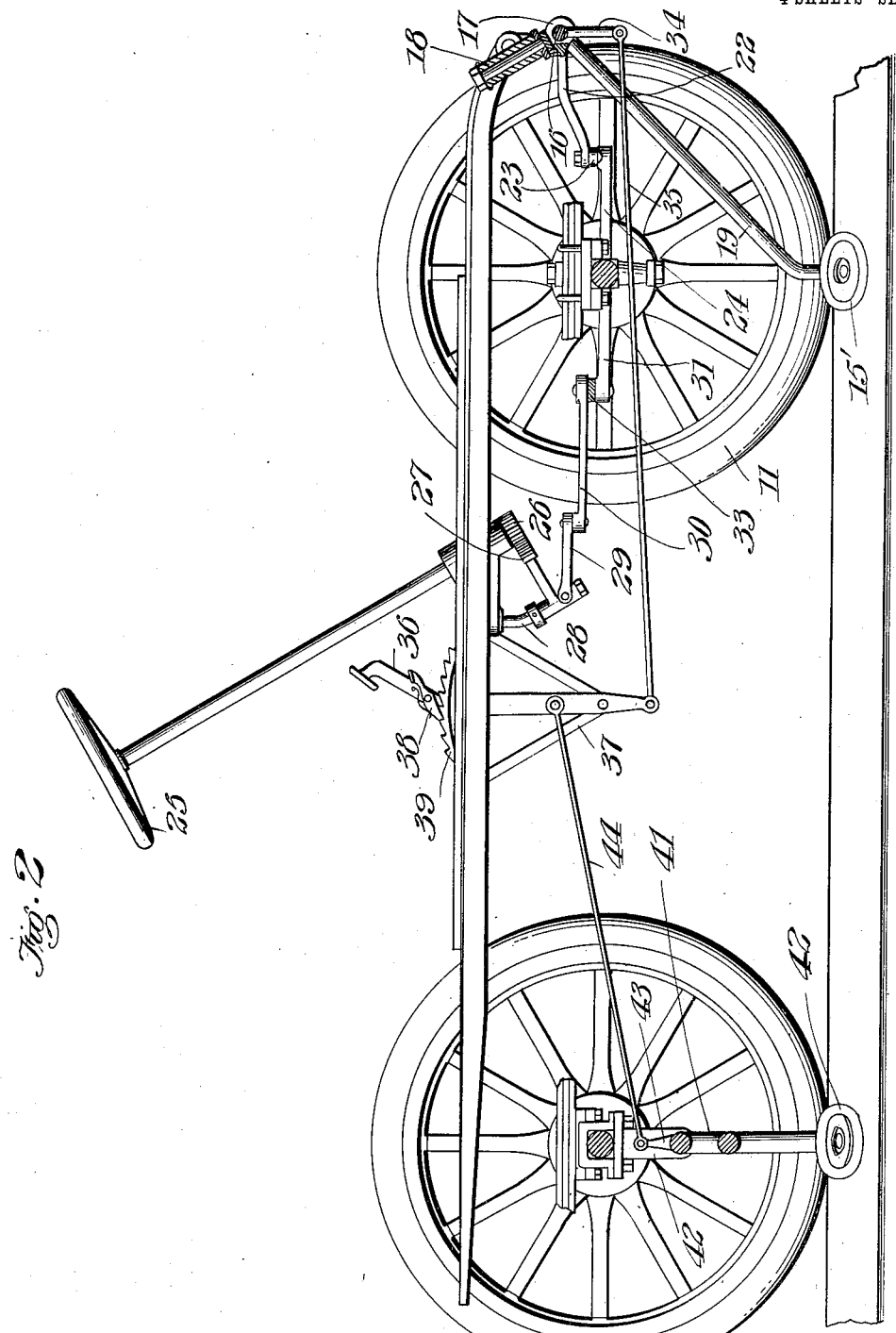

No. 861,830. PATENTED JULY 30, 1907.
L. S. HACKNEY.
AUTOMOBILE TRACK AND MEANS FOR HOLDING AN AUTOMOBILE THEREON.
APPLICATION FILED JUNE 4, 1906.
4 SHEETS—SHEET 3.
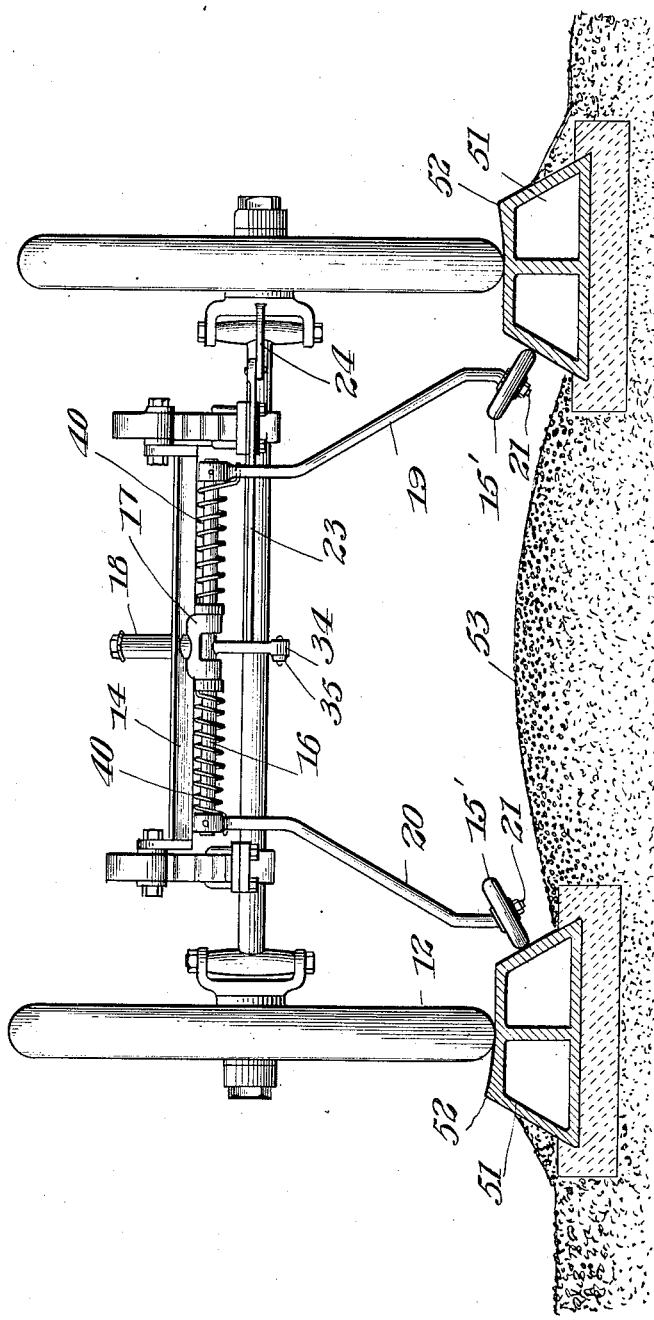

No. 861,830. PATENTED JULY 30, 1907.
L. S. HACKNEY.
AUTOMOBILE TRACK AND MEANS FOR HOLDING AN AUTOMOBILE THEREON.
APPLICATION FILED JUNE 4, 1906.
4 SHEETS—SHEET 4.
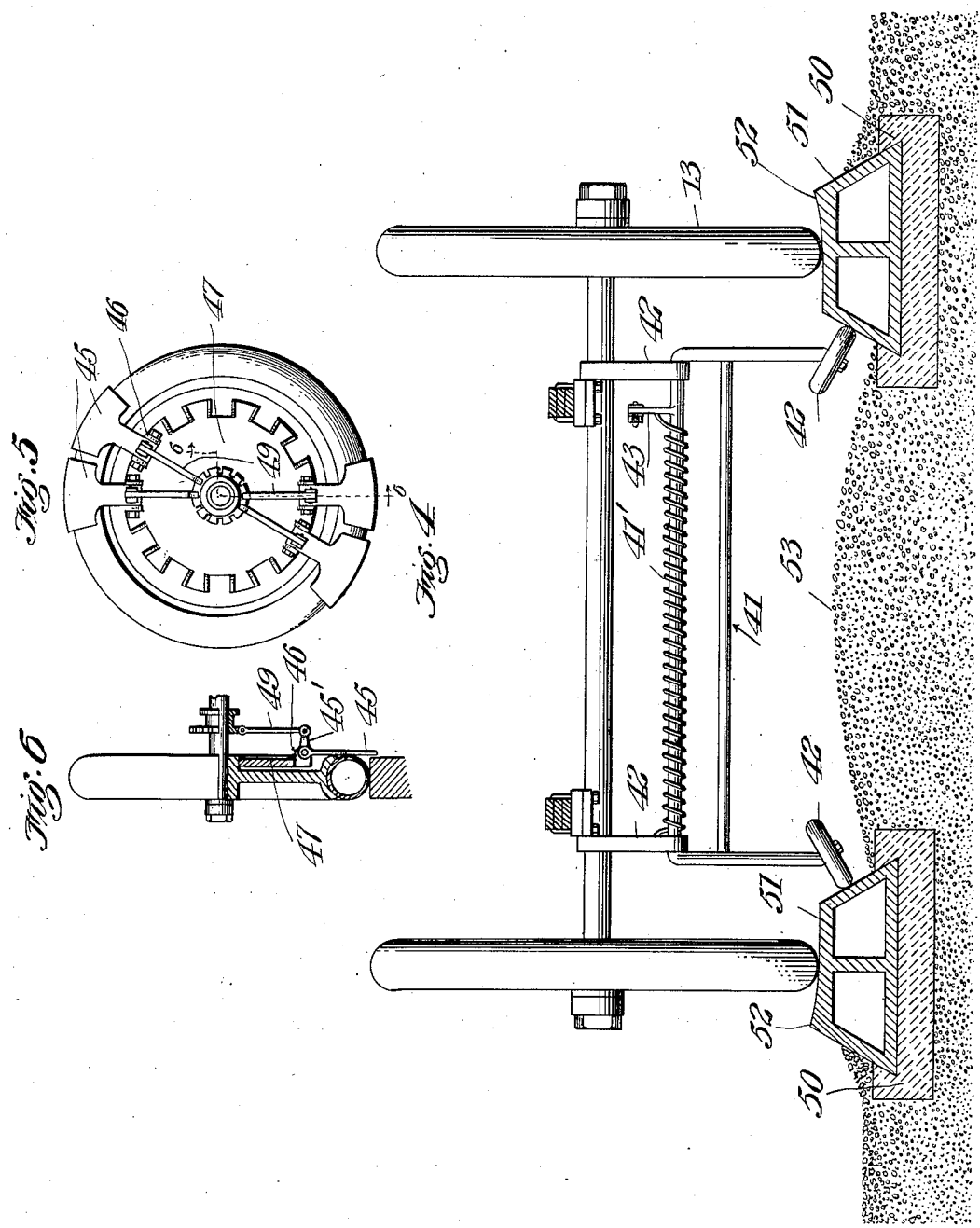
Witnesses
Inventor
Leslie S. Hackney
Paul o Paul
Attorneys

UNITED STATES PATENT OFFICE.

LESLIE S. HACKNEY, OF ST. PAUL, MINNESOTA.

AUTOMOBILE-TRACK AND MEANS FOR HOLDING AN AUTOMOBILE THEREON

No. 861,830.   Specification of Letters Patent.   Patented July 30, 1907.

Application filed June 4, 1906. Serial No. 320,085.

*To all whom it may concern:*

Be it known that I, LESLIE S. HACKNEY, a citizen of the United States, residing at St. Paul, in the county of Ramsey and State of Minnesota, have invented certain new and useful Improvements in Automobile-Tracks and Means for Holding an Automobile Thereon, of which the following is a specification.

It is the object of my invention to provide a special track for an automobile and to attach to the automobile means for guiding the vehicle upon such track without any manual manipulation of the ordinary steering gear of the vehicle, which guiding means can be thrown out of engagement with the track and held suspended above the ground so as not to interfere with the ordinary operation of the automobile when not running on the special track. I accomplish these objects by the mechanism described herein and illustrated in the accompanying drawings, in which, Figure 1. is a plan of my improved track and of so much of an automobile as is necessary to illustrate my invention, with my guiding attachment in place thereon. Fig. 2. is a section on the line 2—2 of Fig. 1. Fig. 3. is a front elevation of the automobile and a cross section of the track. Fig. 4. is a rear end elevation of the automobile and a cross section of the track. Fig. 5. is a side elevation of an automobile wheel showing a modification of the holding device. Fig. 6. is a section on the line 6—6 of Fig. 5.

Referring to the drawings, 10 is the frame of ordinary construction of an automobile having the usual pivoted front wheels 11 and 12 and rear wheels 13. Extending across the front of the car and rigidly secured thereto is a transverse bar 14 to which is pivotally secured in the center thereof an adjustable guide frame 15. This frame preferably consists of a transverse bar 16 which is rotatively mounted in a bifurcated bearing 17, which bearing is pivotally secured in a rigid bearing 18 mounted on the cross bar 14. Rigidly secured to the outer ends of the bar 16 and extending downwardly and rearwardly, are arms 19 and 20 which terminate in shafts 21 on which are rotatively mounted the guide wheels 15′. Rigidly secured to the bearing 17 and extending rearwardly is an arm 22 to which is pivotally secured the shift bar 23, the other end of the bar being pivoted to the outer end of an arm 24 which is rigidly secured to the hub of the wheel 11.

It will be seen from the drawings that the machine is equipped with the usual hand steering wheel 25, the shaft of which is mounted in the frame and has the usual pinion 26 which meshes with the toothed sector 27 which is loosely secured to a depending arm 28 which is fast to the frame of the machine. Pivotally secured to the sleeve of this sector is a bifurcated arm 29, to the outer end of which is pivotally secured a shifting bar 30, the other end of which is secured to an arm 31 which last arm is rigidly secured to the hub of the front wheel 11. The wheel 12 has an arm 32 similar to the arm 31, which arm is secured to the hub of the wheel. Arms 31 and 32 are connected by a bar 33.

Rigidly secured to the transverse bar 14 and in the center thereof is a depending arm 34 to which is pivotally secured one end of a pull rod 35 which extends rearwardly and is pivotally connected to the outer end of a foot lever 36 which foot lever is pivotally mounted in a bearing 37 which is rigidly secured to the under side of the car. This foot lever is operated in the usual manner and has a pawl 38 which engages a sector 39 by means of which the guide frame is kept in any desired position. The guide frame 15 is normally pressed into its operative position by means of springs 40 which are coiled around the transverse shaft 14, one of each of these springs being secured to the shaft and the other end resting against arms 19 and 20.

On the rear shaft of the machine is secured a guiding device for the rear wheels which in this instance preferably consists of a downwardly projecting frame 41 which is pivotally secured to downwardly projecting lugs 42 which are fast to the frame of the machine. On the lower ends of the frame 41 are rotatively mounted guide wheels 42′. The upper part of the frame extends transversely across the machine and on one side is rigidly secured an upwardly projecting arm 43 to which is pivotally secured a pull rod 44, the other end of said rod being pivotally secured to the foot lever 36 by means of which the frame may be thrown out of its operative position. The guide frame 41 is normally pressed into its operative position by means of a spring 41′ which is coiled around the upper transverse bar of the frame; one end being fastened to the lug 42 and the other end bearing against the upwardly projecting arm 43.

In Figs. 5 and 6, I have illustrated a modified form of my invention and in this instance it preferably consists of a number of collapsible flanges 45 which project a slight distance beyond the periphery of the wheel, the inner ends of these flanges are pivotally connected to lugs 46 which project from the periphery of a disk 47. Rigidly secured to the inner end of the flanges 45 are arms 45′ which project inwardly at right angles and to the outer ends of which are pivotally secured link bars 49. These link bars are connected to any well known retracting mechanism, not shown. It will be seen that when the vehicle is to be operated on a track the collapsible flanges are thrown into their operative position and answer the same purpose as the flanges of an ordinary car wheel, the flanges being thrown out of operative position when it is desired to run on level ground.

In the operation of the above described device it will be seen that in order to operate a vehicle of the character described a track or specially constructed roadway would have to be built and to this end I have shown a form of road-way that is especially adapted for vehicles equipped with my device. In the construction of this road-way a foundation of concrete 50 is laid the proper distance apart and in this concrete foundation are secured preferably hollow tile 51 whose top tread flares slightly upwardly and outwardly as at 52. Between the lines of tile may be placed crushed rock or gravel 53.

Other means may be employed for mounting the guide-wheels on the vehicle frame and operating the same and I do not wish to be confined to the particular construction herein shown and described. Various modifications may also be made in the tread-ways for the wheels without departing from the scope of my invention.

When it is desired to propel a vehicle over my improved track the vehicle is first run upon the track and the foot lever 36 is operated by means of which the guiding devices are released and forced into their operative position as shown in the drawings, by their respective springs. The guide wheels contact against the inner sides of the hollow tile track and act in the same manner as would a flange on a wheel. The front guiding frame 15 being pivoted permits the machine to take the curves without any danger resulting therefrom, the rear guide wheels preventing the rear part of the vehicle from being thrown off the track when going around curves. It will thus be seen that when the guide wheels are in their operative position there will be no need of touching the ordinary steering wheel to control the movement of the car as the steering mechanism is connected to the guiding frame 15 and is controlled thereby.

I have shown the tread-way made of concrete or tiling, but if preferred, the way may be made of planking or timbers laid in a suitable bed.

Having described my invention what I claim is:—

1. The combination of an automobile track comprising upwardly projecting wheel guiding means with a guiding frame pivotally secured to the frame of the automobile and connected to the steering apparatus and having wheels adapted to engage the said guiding means, whereby the wheels of the automobile are kept upon the track.

2. The combination of an automobile track comprising upwardly projecting wheel supporting means with a guiding frame pivotally secured to the frame of the automobile and connected to the steering apparatus and having means engaging said wheel supporting means, whereby the wheels of the automobile are prevented from running off the same.

3. In an automobile, mechanism operatively connected with the steering apparatus of the automobile adapted to engage and hold the automobile on an elevated track.

4. Means for holding an automobile on an elevated track comprising a guiding frame pivotally secured to the frame of the automobile, said guiding frame having wheels in the lower end thereof to engage the elevated track; an operative connection between the steering apparatus of the automobile and said guiding frame; and means to raise and lower the wheels of said guiding frame.

5. Means for holding an automobile on an elevated track comprising a transverse bar revolubly mounted in bearings; a spring on said bar, one end being secured thereto and the other end to the bearing; arms secured to the ends of said bar and projecting downwardly; wheels mounted on said arms adapted to engage the elevated track; a short downwardly projecting bar secured to said transverse bar; and an operative connection from said last bar to the steering apparatus of the machine.

6. An automobile track comprising elevated automobile wheel guiding means and guiding devices mounted on the forward and rear portion of the automobile and having wheels to engage said guiding means, the forward guiding device being adapted to yield laterally and the rear guiding device being non-yielding laterally.

7. The combination, with an automobile track comprising upwardly projecting wheel guiding means with guiding frames mounted on the forward and rear portion of the automobile and having wheels to engage said guiding means, said guiding frames being arranged to oscillate on their support, and a foot operated mechanism connected with said frames and whereby they may be raised or lowered, substantially as described.

8. In an automobile, wheel-guiding means mounted on the forward portion thereof and having a lateral movement to accommodate itself to the oscillations of the forward wheels, and means for swinging said guiding means on its pivot to raise or lower the same.

9. An automobile track comprising elevated automobile wheel-guiding means, and a guiding frame mounted on the forward portion of the automobile frame and having a swinging vertical movement.

10. An automobile track comprising automobile wheel guiding means having the inner side projecting upwardly and outwardly and a guiding frame having wheels to engage said guiding means, said guiding frame being fixed against lateral movement but having a vertical oscillating movement, and means for operating said frame.

11. An automobile track comprising elevated automobile wheel guiding means, guiding frames mounted on the forward and rear portion of the automobile frame and having wheels to engage said guiding means, the forward guiding frame being yieldingly mounted with respect to lateral movement and the rear guiding frame being fixed with respect to such movement.

12. An automobile track comprising elevated automobile wheel guiding means, a guiding frame mounted on the forward portion of the automobile frame and having a yielding lateral movement and a swinging vertical movement.

13. An automobile track comprising elevated automobile wheel guiding means, a guiding frame mounted on the forward portion of the automobile frame, and having a swinging vertical movement, and a foot-operated device connected with said frame.

14. An automobile track comprising wheel guiding means having the inner side projecting upwardly and outwardly, a guiding frame pivoted on the automobile frame and having wheels to engage said guiding means and a vertical oscillating movement on its pivot and being fixed against lateral movement.

15. An automobile track comprising a wheel guiding means having the inner side projecting upwardly and outwardly, a guiding frame pivoted on the automobile frame and having wheels to engage said guiding means and a vertical oscillating movement on its pivot and a foot operated device connected with said frame for oscillating the same.

16. An automobile track comprising wheel guiding means, a guiding frame pivoted on the automobile frame and arranged to yield laterally thereon and having an oscillating vertical movement, and a foot operated device connected with said frame.

In witness whereof, I have hereunto set my hand this 25th day of May 1906.

LESLIE S. HACKNEY.

Witnesses:
 RICHARD PAUL,
 J. H. BALDWIN.